United States Patent
Oner-Deliormanli et al.

(10) Patent No.: US 9,527,971 B2
(45) Date of Patent: Dec. 27, 2016

(54) FUNCTIONALIZED POLYMER COMPOSITIONS AND FILMS FORMED FROM THE SAME

(71) Applicant: Dow Global Technologies LLC, Midland, MI (US)

(72) Inventors: Didem Oner-Deliormanli, Bellaire, TX (US); Brian W. Walther, Clute, TX (US); Rajen M. Patel, Freeport, TX (US); Gregory Bunker, Midland, MI (US); John W. Garnett, IV, Omaha, NE (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/429,847

(22) PCT Filed: Mar. 15, 2013

(86) PCT No.: PCT/US2013/032459
§ 371 (c)(1),
(2) Date: Mar. 20, 2015

(87) PCT Pub. No.: WO2014/070237
PCT Pub. Date: May 8, 2014

(65) Prior Publication Data
US 2015/0247014 A1    Sep. 3, 2015

Related U.S. Application Data

(60) Provisional application No. 61/722,274, filed on Nov. 5, 2012.

(51) Int. Cl.
C08L 23/04 (2006.01)
C08L 23/08 (2006.01)
C08L 51/06 (2006.01)
C08J 5/18 (2006.01)
C08L 51/00 (2006.01)
C08L 77/00 (2006.01)
C08L 77/02 (2006.01)

(52) U.S. Cl.
CPC .............. *C08J 5/18* (2013.01); *C08L 23/0807* (2013.01); *C08L 51/00* (2013.01); *C08J 2323/06* (2013.01); *C08J 2423/08* (2013.01); *C08J 2451/06* (2013.01); *C08L 77/00* (2013.01); *C08L 77/02* (2013.01)

(58) Field of Classification Search
None
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,705,565 A | 1/1998 | Hughes et al. |
| 6,034,176 A | 3/2000 | Patel et al. |
| 6,075,091 A | 6/2000 | Tanaka et al. |
| 9,120,888 B2 | 9/2015 | Karjala et al. |
| 2006/0199914 A1 | 9/2006 | Harris et al. |
| 2010/0101822 A1 | 4/2010 | Bunker et al. |
| 2010/0143651 A1 | 6/2010 | Silvis et al. |
| 2010/0160497 A1 | 6/2010 | Karjala et al. |

OTHER PUBLICATIONS

Nir, M.M. et. Al., "Performance of Reprocessed Multilayer LDPE/Nylon-6 Film" Polymer Engineering and Science vol. 35(23) pp. 1878-1883, Dec. 1995.
PCT/US2013/032459, International Search Report and Written Opinion of the International Searching Authority, Mailed Jul. 23, 2013.
PCT/ US2013/032459, International Preliminary Report on Patentability, mailed May 14, 2015.
Dow Global Technologies, Inc., EP Appln. No. 13716897.7, Rule 161 and 162 Communication sent Jun. 12, 2015.

*Primary Examiner* — Jeffrey Mullis

(57) ABSTRACT

The invention provides a composition comprising at least the following: A) an anhydride and/or carboxylic acid functionalized ethylene/alpha-olefin interpolymer having the following properties: i) a melt viscosity (177° C.) less than, or equal to, 200,000 cP, ii) a density from 0.855 to 0.900 g/cc; B) an ethylene-based polymer; and C) a polar polymer.

12 Claims, 3 Drawing Sheets

US 9,527,971 B2

FUNCTIONALIZED POLYMER COMPOSITIONS AND FILMS FORMED FROM THE SAME

REFERENCE TO RELATED APPLICATIONS

This application claims the benefit of U.S. Provisional Application No. 61/722,274, filed on Nov. 5, 2012.

BACKGROUND

Compatibilization of polar polymers, such as polyamide and/or EVOH, with nonpolar polymers such as polyethylene and/or polypropylene is commonly achieved by maleic anhydride grafted polymers. Polymer compositions containing functionalized polymers are described in the following references: U.S. Pat. No. 6,075,091, US 20060199914, WO 1994/025526, WO 2007/146875, and WO2011/163176. See also, A. Mendez-Prieto et al., Multilayer Structure Using Reprocessed Coextruded LLDPE/TIE/PA-6 Films, *Journal of Polymer Engineering*, Vol. 18, No. 3, 1998, 221-234; M. M. Nir et al., Performance of Reprocessed Multilayer LDPE/Nylon-6 Film, Polymer Engineering and Sciences, 1995, Vol. 35, No. 23, 1878-1883.

Traditional maleic anhydride functionalized olefin-based polymers, containing high maleic anhydride content, have been used as compatibilizers between polyolefin and EVOH and/or polyamide, in multicomponent compositions, where the maleic anhydride functionalized polyolefin compatibilizes olefin-based polymers and EVOH and/or polyamide. However, in multicomponent compositions, where the interfacial surface areas are higher, the traditional maleic anhydride functionalized polyolefins can react and form a cross-linked interphase with the polar polymer. Articles such as films, sheets produced from such compositions typically have poor optical and mechanical properties. There is a need for new polymer compositions that will effectively compatibilize polyolefin/polyamide, polyolefin/EVOH, or, polyolefin/polyamide/EVOH systems, without resulting in cross-linked interphases, and which can be used to form films, or sheets with improved optical and mechanical properties. These needs have been met by the following invention.

SUMMARY OF THE INVENTION

The invention provides a composition comprising at least the following:
A) an anhydride and/or carboxylic acid functionalized ethylene/alpha-olefin interpolymer having the following properties:
  i) a melt viscosity (177° C.) less than, or equal to, 200,000 cP,
  ii) a density from 0.855 to 0.930 g/cc;
B) an ethylene-based polymer; and
C) a polar polymer.

DETAILED DESCRIPTION

Figure 1:
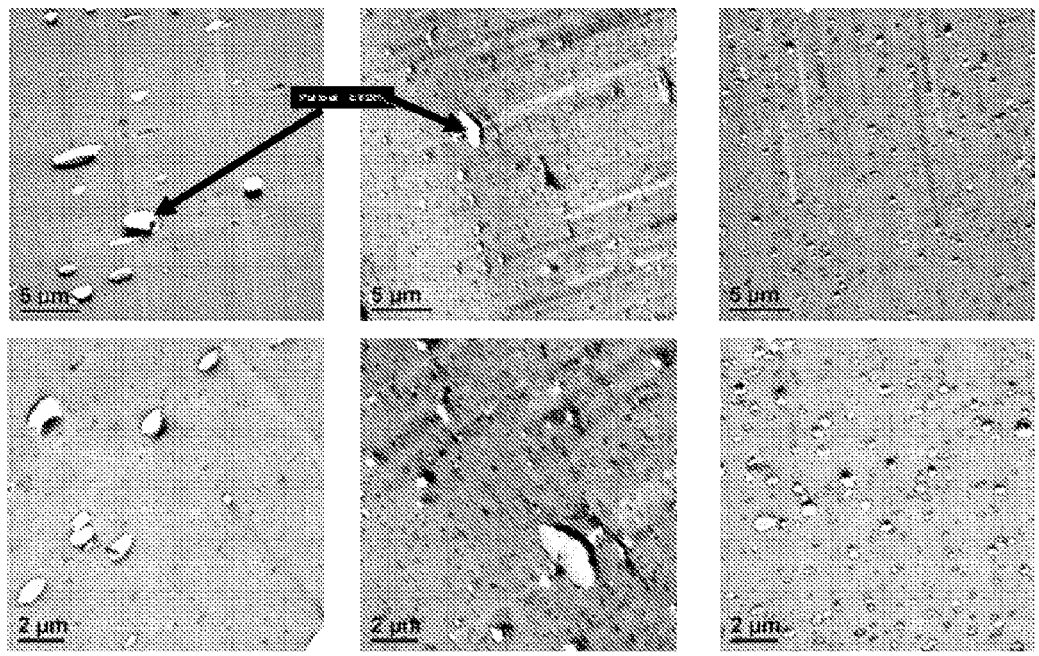
FIG. 1 shows TEM images of films formed from Comparative Ex. A (left), Comparative Ex. B (center) and Inventive Ex. 1 (right).

It has been surprisingly discovered that the inventive compositions can be used to form articles with well dispersed, small and discrete particles of polar polymers into a nonpolar polymer matrix. These articles have excellent physical properties, and excellent optical properties.

As discussed above, the invention provides a composition, which comprises at least the following:
A) an anhydride and/or carboxylic acid functionalized ethylene/alpha-olefin interpolymer having the following properties:
  i) a melt viscosity (177° C.) less than, or equal to, 200,000 cP,
  ii) a density from 0.855 to 0.930 g/cc;
B) an ethylene-based polymer; and
C) a polar polymer.

An inventive composition may comprise a combination of two or more embodiments as described herein.

The anhydride and/or carboxylic acid functionalized ethylene/alpha-olefin interpolymer (component A) may comprise a combination of two or more embodiments as described herein.

The ethylene-based polymer (component B) may comprise a combination of two or more embodiments as described herein.

The polar polymer (component C) may comprise a combination of two or more embodiments as described herein.

In one embodiment, the anhydride and/or carboxylic acid functionalized ethylene/alpha-olefin interpolymer has i) a melt viscosity (177° C.) less than, or equal to, 70,000 cP.

In one embodiment, the anhydride and/or carboxylic acid functionalized ethylene/alpha-olefin interpolymer has i) a melt viscosity (177° C.) less than, or equal to, 50,000 cP.

In one embodiment, the anhydride and/or carboxylic acid functionalized ethylene/alpha-olefin interpolymer has i) a melt viscosity (177° C.) less than, or equal to, 30,000 cP.

In one embodiment, the anhydride and/or carboxylic acid functionalized ethylene/alpha-olefin interpolymer has i) a melt viscosity (177° C.) less than, or equal to, 20,000 cP.

In one embodiment, the anhydride and/or carboxylic acid functionalized ethylene/alpha-olefin interpolymer has i) a melt viscosity (177° C.) greater than, or equal to, 2,000 cP, further greater than, or equal to, 3,000 cP, and further greater than, or equal to, 5,000 cP.

In one embodiment, the anhydride and/or carboxylic acid functionalized ethylene/alpha-olefin interpolymer has i) a melt viscosity (177° C.) from 5,000 cP to 200,000 cP.

In one embodiment, the polar polymer (component C) is selected from an ethylene vinyl alcohol polymer, a polyamide, a polyester, a polyester glycol, or combinations thereof.

In one embodiment, the polar polymer is selected from ethylene/vinyl alcohol polymer, polyamide, polyethylene terephthalate, polyethylene terephthalate glycol, or combinations thereof.

In one embodiment, the polar polymer (component C) is selected from an ethylene vinyl alcohol polymer, a polyamide, or a combination thereof.

In one embodiment, the polar polymer (component C) has a melt index (I2) from 0.1 to 20 g/10 min, further from 0.2 to 10 g/10 min, and further from 0.5 to 5 g/10 min.

In one embodiment, the polar polymer (component C) has a density from 1.00 to 1.30 g/cc, further from 1.10 to 1.20 g/cc (1 cc=1 cm$^3$).

In one embodiment, the polar polymer (component C) is not subject to a drying process to remove absorbed moisture prior to use.

The polar polymer (component C) may comprise a combination of two or more embodiments as described herein.

In one embodiment, the anhydride and/or carboxylic acid functionalized ethylene/alpha-olefin interpolymer (component A) has a MWD (Mw/Mn) from 1.5 to 3.5, further from 2.0 to 3.0.

In one embodiment, the anhydride and/or carboxylic acid functionalized ethylene/alpha-olefin interpolymer has a density from 0.855 g/cm$^3$ to 0.930 g/cm$^3$.

In one embodiment, the anhydride and/or carboxylic acid functionalized ethylene/alpha-olefin interpolymer has a density from 0.860 g/cm$^3$ to 0.900 g/cm$^3$, further from 0.865 g/cm$^3$ to 0.890 g/cm$^3$, further from 0.865 g/cm$^3$ to 0.880 g/cm$^3$.

In one embodiment, the anhydride and/or carboxylic acid functionalized ethylene/alpha-olefin interpolymer has a weight average molecular weight (Mw) from 4,000 to 30,000 g/mole.

In one embodiment, the anhydride and/or carboxylic acid functionalized ethylene/alpha-olefin interpolymer is an anhydride and/or carboxylic acid functionalized ethylene/alpha-olefin copolymer.

The anhydride and/or carboxylic acid functionalized ethylene/alpha-olefin interpolymer (component A) may comprise a combination of two or more embodiments as described herein.

In one embodiment, the ethylene-based polymer (component B) has a melt index (I2) from 0.5 to 50 g/10 min.

In one embodiment, the ethylene-based polymer (component B) has a density from 0.860 to 0.960 g/cc, further from 0.880 to 0.940 g/cc, further from 0.900 to 0.930 g/cc (1 cc=1 cm$^3$).

In one embodiment, the ethylene-based polymer (component B) has a density from greater than, or equal to, 0.920 g/cc.

In one embodiment, the ethylene-based polymer (component B) has a density from 0.920 to 0.940 g/cc.

The ethylene-based polymer (component B) may comprise a combination of two or more embodiments as described herein.

In one embodiment, component A is present in an amount from 0.5 to 30 weight percent, further from 1 to 25 weight percent, further from 2 to 20 weight percent, based on the weight of the composition.

In one embodiment, component C is present in an amount from 1 to 30 weight percent, further from 3 to 25 weight percent, further from 5 to 20 weight percent, based on the weight of the composition.

In one embodiment, the composition further comprises an anhydride and/or carboxylic acid functionalized olefin-based polymer.

In one embodiment, the composition further comprises an anhydride and/or carboxylic acid functionalized ethylene-based polymer, further an anhydride and/or carboxylic acid functionalized ethylene/alpha-olefin interpolymer, and further an anhydride and/or carboxylic acid functionalized ethylene/alpha-olefin copolymer.

In one embodiment, the composition further comprises an anhydride and/or carboxylic acid functionalized propylene-based polymer, further an anhydride and/or carboxylic acid functionalized propylene/alpha-olefin interpolymer or propylene/ethylene interpolymer, and further an anhydride and/or carboxylic acid functionalized propylene/alpha-olefin copolymer or propylene/ethylene copolymer.

In one embodiment, the composition does not comprise a crosslinking agent.

In one embodiment, the composition comprises less than 0.1 weight percent, further less than 0.01 weight percent, further less than 0.001 weight percent, of a crosslinking agent.

In a preferred embodiment, the composition is not crosslinked.

The invention also provides an article comprising at least one component formed from an inventive composition of any of any embodiment described herein.

The invention also provides a film comprising at least one component formed from an inventive composition of any embodiment described herein.

In one embodiment, the film further comprises at least one layer formed from a composition comprising a polar polymer. In a further embodiment, the composition comprises greater than, or equal to, 50 weight percent, further greater than, or equal to, 80 weight percent, further greater than, or equal to, 95 weight percent, of the polar polymer. In one embodiment, the polar polymer is selected from an ethylene vinyl alcohol polymer, a polyamide, a polyester, a polyester glycol, or combinations thereof.

In one embodiment, the film further comprises at least one layer formed from a composition comprising an olefin-based polymer. In a further embodiment, the composition comprises greater than, or equal to, 50 weight percent, further greater than, or equal to, 80 weight percent, further greater than, or equal to, 95 weight percent of the polar polymer. In one embodiment, the olefin-based polymer is selected from an ethylene-based polymer, a propylene-based polymer, or combinations thereof.

In a preferred embodiment, the film is not crosslinked.

In one embodiment, the film further comprises at least one layer formed from a composition comprising a polar polymer. In a further embodiment, the film further comprises at least one layer formed from a composition comprising an olefin-based polymer.

In one embodiment, the olefin-based polymer is selected from an ethylene-based polymer, a propylene-based polymer, or combinations thereof.

An inventive film may comprise a combination of two or more embodiments as described herein.

The invention also provides a method of making a film, said method comprising extruding an inventive composition of any embodiment described herein. Those skilled in art would know to control the level of moisture in the components A-C before compounding.

In one embodiment, the polar polymer (component C) is not subject to a drying process to remove absorbed moisture prior to use.

An inventive method may comprise a combination of two or more embodiments as described herein.

An inventive composition may comprise a combination of two or more embodiments as described herein.

An inventive article may comprise a combination of two or more embodiments as described herein.

Component A (Anhydride and/or Carboxylic Acid Functionalized Ethylene/Alpha-Olefin Interpolymer)

In one embodiment, the anhydride and/or carboxylic acid functionalized ethylene/alpha-olefin interpolymer is an anhydride and/or carboxylic acid functionalized ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, component A is an anhydride and carboxylic acid functionalized ethylene/alpha-olefin interpolymer, and further an anhydride and carboxylic acid functionalized ethylene/alpha-olefin copolymer. An example of such a functionalized copolymer includes AFFINITY GA 1000R Polyolefin Plastomer, available from The Dow Chemical Company.

In one embodiment, the anhydride and/or carboxylic acid functionalized ethylene/alpha-olefin interpolymer of Component A comprises greater than, or equal to, 0.5 weight percent, further greater than, or equal to, 0.8 weight percent, further greater than, or equal to, 0.9 weight percent, and further greater than, or equal to, 1.0 weight percent of the anhydride and/or carboxylic acid functionality, based on the weight of the polymer. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer of Component A comprises from 0.6 to 1.9 weight percent, further from 0.8 to 1.7 weight percent, further from 0.9 to 1.5 weight percent of the anhydride and/or carboxylic acid functionality, based on the weight of the polymer.

In one embodiment, the anhydride and/or carboxylic acid functionalized ethylene/alpha-olefin interpolymer of Component A has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, anhydride and/or carboxylic acid functionalized ethylene/alpha-olefin interpolymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) less than, or equal to, 5.0, further less than, or equal to, 4.0, further less than, or equal to, 3.0, further less than, or equal to, 2.8, and further less than, or equal to, 2.5. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) greater than, or equal to, 1.1, further greater than, or equal to, 1.3, further greater than, or equal to, 1.5, and further greater than, or equal to, 2.0. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a weight average molecular weight (Mw) less than, or equal to, 50,000 g/mole, further less than, or equal to, 40,000 g/mole, further less than, or equal to, 30,000 g/mole. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a weight average molecular weight (Mw) greater than, or equal to, 2000 g/mole, further greater than, or equal to, 3000 g/mole, further greater than, or equal to, 4000 g/mole. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt index (I2), or calculated melt index (I2), greater than, or equal to, 300 g/10 min, further greater than, or equal to, 400 g/10 min, and more further greater than, or equal to, 500 g/10 min. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt index (I2), or calculated melt index (I2), less than, or equal to, 1500 g/10 min, further less than, or equal to, 1200 g/10 min, and more further less than, or equal to, 1000 g/10 min. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a percent crystallinity of less than, or equal to, 40 percent, further less than, or equal to, 30 percent, further less than, or equal to, 25 percent, and further less than, or equal to, 20 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a percent crystallinity of greater than, or equal to, 2 percent, further greater than, or equal to, 5 percent, further greater than, or equal to, 10 percent, and further greater than, or equal to, 15 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density greater than, or equal to, 0.850 g/cc, further greater than, or equal to, 0.855 g/cc, add further greater than, or equal to, 0.860 g/cc. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density less than, or equal to, 0.900 g/cc, further less than, or equal to, 0.895 g/cc, and further less than, or equal to, 0.890 g/cc. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density less than, or equal to, 0.885 g/cc, further less than, or equal to, 0.880 g/cc, and further less than, or equal to, 0.875 g/cc. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density from 0.855 $g/cm^3$ to 0.900 $g/cm^3$, further from 0.860 $g/cm^3$ to 0.895 $g/cm^3$, further from 0.865 $g/cm^3$ to 0.890 $g/cm^3$, and further from 0.865 $g/cm^3$ to 0.880 $g/cm^3$. In a further embodiment, the anhydride and/or carboxylic acid functionalized ethylene/alpha-olefin interpolymer is an anhydride and/or carboxylic acid functionalized ethylene/α-olefin copolymer.

In one embodiment, the composition comprises from 2 to 30 weight percent, and further from 5 to 20 weight percent of component A, based on the weight of the composition.

An anhydride and/or carboxylic acid functionalized ethylene/alpha-olefin interpolymer may comprise a combination of two or more embodiments as described herein.

An anhydride and/or carboxylic acid functionalized ethylene/alpha-olefin copolymer may comprise a combination of two or more embodiments as described herein.

Ethylene/α-Olefin Interpolymers (Based Polymers for Component A)

The base polymer used to form the anhydride and/or carboxylic acid functionalized ethylene/α-olefin interpolymer is an ethylene/α-olefin interpolymer.

In one embodiment, the ethylene/α-olefin interpolymer, is an ethylene/α-olefin copolymer. Preferred α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene.

In one embodiment, the ethylene/α-olefin interpolymer has a melt viscosity less than, or equal to, 50,000 cP, further less than, or equal to, 40,000 cP, and further less than, or equal to, 30,000 cP, at 350° F. (177° C.). In a further embodiment, the ethylene/α-olefin interpolymer is an ethylene/α-olefin copolymer.

In one embodiment, ethylene/α-olefin interpolymer has a melt viscosity greater than, or equal to, 2,000 cP, further greater than, or equal to, 4,000 cP, further greater than, or equal to, 5,000 cP, at 350° F. (177° C.). In a further embodiment, the ethylene/α-olefin interpolymer is an ethylene/α-olefin copolymer.

In one embodiment, the ethylene/α-olefin interpolymer has a melt viscosity from 2,000 cP to 20,000 cP, further from 4,000 cP to 16,000 cP, and further from 5,000 cP to 10,000 cP, at 350° F. (177° C.). In a further embodiment, the ethylene/α-olefin interpolymer is an ethylene/α-olefin copolymer.

In one embodiment, the ethylene/α-olefin interpolymer has a molecular weight distribution (Mw/Mn) less than, or equal to, 5.0, and further less than, or equal to, 4.0, and further less than, or equal to, 3.0. In a further embodiment, the ethylene/α-olefin interpolymer is an ethylene/α-olefin copolymer.

In one embodiment, the ethylene/α-olefin interpolymer has a molecular weight distribution (Mw/Mn) greater than, or equal to, 1.0, and further greater than, or equal to, 1.5, and further greater than, or equal to, 2.0. In a further embodiment, the ethylene/α-olefin interpolymer is an ethylene/α-olefin copolymer.

In one embodiment, the ethylene/α-olefin interpolymers have a molecular weight distribution from 1.1 to 3.5, further from 1.1 to 3, and further from 1.1 to 2.5. In a further embodiment, the ethylene/α-olefin interpolymer is an ethylene/α-olefin copolymer.

In one embodiment, the ethylene/α-olefin interpolymer has a melt index (I2 or MI), or calculated melt index (I2), greater than, or equal to, 500 g/10 min, further greater than, or equal to, 800 g/10 min, and further greater than, or equal to, 1000 g/10 min. In a further embodiment, the ethylene/α-olefin interpolymer is an ethylene/α-olefin copolymer.

In one embodiment, the ethylene/α-olefin interpolymer has a percent crystallinity of less than, or equal to, 40 percent, further less than, or equal to, 30 percent, further less than, or equal to, 25 percent, and further less than, or equal to, 20 percent, as determined by DSC.

In a further embodiment, the ethylene/α-olefin interpolymer is an ethylene/α-olefin copolymer.

In one embodiment, the ethylene/α-olefin interpolymer has a percent crystallinity of greater than, or equal to, 2 percent, further greater than, or equal to, 5 percent, further greater than, or equal to, 10 percent, and further greater than, or equal to, 15 percent, as determined by DSC. In a further embodiment, the ethylene/α-olefin interpolymer is an ethylene/α-olefin copolymer.

In one embodiment, the ethylene/α-olefin interpolymer has a percent crystallinity from 2 to 30 percent, further from 5 to 25 percent, and further from 10 to 20 percent, as determined by DSC. In a further embodiment, the ethylene/α-olefin interpolymer is an ethylene/α-olefin copolymer.

In one embodiment, the ethylene/α-olefin interpolymer has a percent crystallinity from 5 to 30 percent, further from 10 to 25 percent, and further from 15 to 23 percent, as determined by DSC. In a further embodiment, the ethylene/α-olefin interpolymer is an ethylene/α-olefin copolymer.

In one embodiment, the ethylene/α-olefin interpolymer has a density greater than, or equal to, 0.855 g/cc, further greater than, or equal to, 0.860 g/cc, further greater than, or equal to, 0.865 g/cc. In a further embodiment, the ethylene/α-olefin interpolymer is an ethylene/α-olefin copolymer.

In one embodiment, the ethylene/α-olefin interpolymer has a density less than, or equal to, 0.900 g/cc, further less than, or equal to, 0.895 g/cc, further less than, or equal to, 0.890 g/cc. In a further embodiment, the ethylene/α-olefin interpolymer is an ethylene/α-olefin copolymer.

In one embodiment, the ethylene/α-olefin interpolymers has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$. In a further embodiment, the ethylene/α-olefin interpolymer is an ethylene/α-olefin copolymer.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin polymers suitable for the invention include the ultra low molecular weight ethylene polymers described in U.S. Pat. Nos. 6,335,410, 6,054,544 and 6,723,810, each fully incorporated herein by reference.

In one embodiment, the ethylene/α-olefin interpolymer is a homogeneously branched linear interpolymer, and further a copolymer, or a homogeneous branched substantially linear interpolymer, and further a copolymer.

In one embodiment, the ethylene/α-olefin interpolymer is a homogeneously branched linear interpolymer, and further a copolymer.

In one embodiment, the ethylene/α-olefin interpolymer is a homogeneous branched substantially linear interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B H and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

An ethylene/α-olefin interpolymer may comprise a combination of two or more embodiments as described herein.

An ethylene/α-olefin copolymer may comprise a combination of two or more embodiments as described herein.

Component B (Ethylene-Based Polymer)

In one embodiment, the ethylene-based polymer has a melt index (I2) from 0.5 to 50 g/10 min, further from 0.5 to 20 g/10 min, further from 0.5 to 10 g/10 min.

In one embodiment, the ethylene-based polymer has a density from 0.860 to 0.960 g/cc (1 cc=1 cm$^3$).

In one embodiment, the ethylene-based polymer has a density from greater than, or equal to, 0.920 g/cc.

In one embodiment, the ethylene-based polymer has a density from 0.920 to 0.940 g/cc.

In one embodiment component B is an ethylene/alpha-olefin interpolymer, and further an ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene/alpha-olefin interpolymer of component B has a molecular weight distribution (Mw/Mn) greater than, or equal to, 1.1, further greater than, or equal to, 1.3, further greater than, or equal to, 1.5, and further greater than, or equal to, 1.7. In a further embodiment, the ethylene/alpha-olefin interpolymer is an ethylene/α-olefin copolymer.

In one embodiment, the ethylene/alpha-olefin interpolymer of component B has a molecular weight distribution (Mw/Mn) less than, or equal to, 10, further less than, or equal to, 7.0, and further less than, or equal to, 5.0. In a further embodiment, the ethylene/alpha-olefin interpolymer is an ethylene/α-olefin copolymer.

In one embodiment, the ethylene/alpha-olefin interpolymer of component B has a melt index (I2 or MI) greater than, or equal to, 0.1 g/10 min, further greater than, or equal to, 0.2 g/10 min, and further greater than, or equal to, 0.5 g/10 min. In a further embodiment, the ethylene/alpha-olefin interpolymer is an ethylene/α-olefin copolymer.

In one embodiment, the ethylene/alpha-olefin interpolymer of component B has a melt index (I2 or MI) less than, or equal to, 20 g/10 min, further less than, or equal to, 10 g/10 min, and further less than, or equal to, 5 g/10 min. In a further embodiment, the ethylene/alpha-olefin interpolymer is an ethylene/α-olefin copolymer.

In one embodiment, the ethylene/alpha-olefin interpolymer of component B has a density greater than, or equal to, 0.870 g/cc, further greater than, or equal to, 0.880 g/cc, and further greater than, or equal to, 0.890 g/cc. In a further embodiment, the ethylene/alpha-olefin interpolymer is an ethylene/α-olefin copolymer.

In one embodiment, the ethylene/alpha-olefin interpolymer of component B has a density greater than, or equal to, 0.915 g/cc, further greater than, or equal to, 0.918 g/cc, and further greater than, or equal to, 0.920 g/cc. In a further embodiment, the ethylene/alpha-olefin interpolymer is an ethylene/α-olefin copolymer.

In one embodiment, the ethylene/alpha-olefin interpolymer of component B has a density less than, or equal to, 0.950 g/cc, further less than, or equal to, 0.940 g/cc, and further less than, or equal to, 0.930 g/cc. In a further embodiment, the ethylene/alpha-olefin interpolymer is an ethylene/α-olefin copolymer.

In one embodiment, the ethylene/alpha-olefin interpolymer of component B has a density from 0.870 g/cm$^3$ to 0.940 g/cm$^3$, further from 0.880 g/cm$^3$ to 0.930 g/cm$^3$, and further from 0.890 g/cm$^3$ to 0.920 g/cm$^3$. In a further embodiment, the ethylene/alpha-olefin interpolymer is an ethylene/α-olefin copolymer.

The ethylene-based polymer may comprise a combination of two or more embodiments as described herein.

The ethylene/alpha-olefin interpolymer (component B) may comprise a combination of two or more embodiments as described herein.

The ethylene/alpha-olefin copolymer (component B) may comprise a combination of two or more embodiments as described herein.

DEFINITIONS

Unless stated to the contrary, all test methods are current as of the filing date of this disclosure.

The term "composition," as used herein, includes materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. A polymer may also contain trace amounts of catalyst residues and/or other residues associated with its polymerization and/or isolation.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "anhydride and/or carboxylic acid functionalized ethylene/alpha-olefin interpolymer," as used herein, refers to an ethylene/alpha-olefin interpolymer that comprises at least one anhydride group and/or at least one acid group (for example, —COOH formed by the hydrolysis of an anhydride) linked by a covalent bond.

The term "polar polymer," as used herein, refers to polymer formed from at least one monomer that comprises at least one heteroatom. Some examples of heteroatoms include O, N, P and S.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity is measured in accordance with ASTM D 3236 (350° F., 177° C.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermoset. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index (I2, or MI) of an ethylene-based polymer is measured in accordance with ASTM D-1238, condition 190° C./2.16 kg. For high I2 polymers (I2 greater than, or equal to, 200 g/mole, melt index is preferably calculated from Brookfield viscosity as described in U.S. Pat. Nos. 6,335, 410; 6,054,544; 6,723,810. I2(190° C./2.16 kg)= $3.6126[10^{(log(\eta)-6.6928)/-1.1363}]-9.31851$, where $\eta$=melt viscosity, in cP, at 350° F.

Gel Permeation Chromatography

The average molecular weights and molecular weight distributions for ethylene-base polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns The solvent is 1,2,4 trichloro-benzene. The samples are prepared at a concentration of "0.1 gram of polymer' in "50 milliliters" of solvent. The solvent used to prepare the samples contains "200 ppm" of butylated hydroxytoluene (BHT). Samples are prepared by agitating lightly for two hours at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using VISCOTEK TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

DSC

Differential Scanning calorimetry (DSC) is used to measure crystallinity in polyethylene (PE) based samples and polypropylene (PP) based samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) of each polymer is determined from the second heat curve obtained from DSC, as described above. The crystallization temperature ($T_c$) is measured from the first cooling curve.

Density

Density is measured in accordance with ASTM D-792.

Fourier Transform Infrared Spectroscopy (FTIR) Analysis—Maleic Anhydride Content.

The concentration of maleic anhydride is determined by the ratio of peak heights of the maleic anhydride, at wave number 1791 $cm^{-1}$, to the polymer reference peak, which, in case of polyethylene, is at wave number 2019 $cm^{-1}$. Maleic anhydride content is calculated by multiplying this ratio with the appropriate calibration constant. The equation used for maleic grafted polyolefins (with reference peak for polyethylene) has the following form, as shown in Equation 1A.

MAH (wt. %)=$A$*{[FTIR PeakArea@1791 cm-1]/
[FTIR PeakArea 2019 cm-1]+$B$*[FTIR
PeakArea@1712 cm-1]/[FTIR PeakArea@2019
cm-1]} (Eqn. 1A)

The calibration constant A can be determined using C13 NMR standards. The actual calibration constant may differ slightly depending on the instrument and polymer. The signal at wave number 1712 $cm^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Maleic anhydride and acid are represented by peaks at about 1791 and 1712 $cm^{-1}$, respectively.

EXPERIMENTAL

Materials

Materials are shown in Table 1 below.

TABLE 1

Materials used in this study

| Materials | Composition | Melt Index 12 (190° C.; 2.16 kg; g/10 min) | Density (g/cc) |
|---|---|---|---|
| AMPLIFY TY 1053H | Maleic anhydride (MAH) grafted high density polyethylene | 2.0 | 0.96 |
| AMPLIFY TY 1052H | Maleic anhydride (MAH) grafted polyethylene | 1.3 | 0.87 |
| DOWLEX 2045G | LLDPE | 1.0 | 0.92 |
| EVAL H171B** (lubricated) | 38 mol % Ethylene Vinyl Alcohol Copolymer | 1.7 | 1.17 |
| EVAL L171B** (lubricated) | 27 mol % Ethylene Vinyl Alcohol Copolymer | 4 (at 230° C.) | 1.2 |
| ULTRAMID B40L*** | Polyamide 6 | 1.13 | |

**TDS supplied from EVAL Americas
***TDS supplied from BASF

Synthesis of Component A—MAH-g-EO1

Low molecular weight ethylene-octene copolymer with a viscosity range of 6,000 to 17,000 cps, measured at 350° F., using a Brookfield viscosity. Nominal 1000 MI (calculated—see footnote in Table 2), 0.87 g/cc density ethylene-octene copolymer.

Maleic Anhydride (MAH—DeGussa DHBP or Equivalent)

Hydrobrite 380—hydrotreated paraffinic oil to dilute peroxide as needed. (1:1 ratio of peroxide:oil).

LUPEROX 101—2,5-Bis(tert-butylperoxy)-2,5-dimethylhexane (290.44 g/mol). Barrel, Gear Pump, and Die Temperature settings: Feed barrel—cooling (49° C.); Barrel #3: 120° C., injection of maleic at injection port 3a and peroxide at port 4a; Barrel #4—11: 235° C.; Transfer Lines and Gear pump: 150° C.; Die: 204° C.; Screw Speed 386 rpm; MAH 16.25 lb/hr; MAH % Feed 1.55%; "1:1 Oil:PDX" 3.6 lb/hr; "1:1 Oil:PDX" % Feed 0.34%; Pure PDX Feed 0.17%; Vac. Pressure 20 cm Hg.

MAH-g-EO1 (see Table 2) was made on a "92 mm" co-rotating twin screw extruder (TSE). The process is summarized in the following steps: (a) the TSE was set to run at the selected barrel temperature profiles, and the screw speeds set to the desired RPMs; (b) polymer pellets were fed into the extruder hopper of the extruder by a gravimetrically, controlled auger feeder, at the desired polymer feed rate; (c) molten MAH was injected into the barrel; (d) peroxide was added via a 1:1 mineral oil solution, at a target feed rate, and injected into the barrel, downstream from the MAH; (e) kneading blocks distributed the reactive ingredients and heated the polymer melt through mechanical energy dissipation, and the reaction occurred following thermal decomposition of peroxide initiator; (f) volatile unreacted components and byproducts were removed at a vacuum port; (g) the melt was cooled in the final barrel section and fed to a gear pump; (h) the gear pump fed a die, from which the melt went to an underwater pelletizer. A pellet slurry cooling line of sufficient length was used to achieve residence time greater than 60 seconds, to cool pellets to less than 25° C. The pelletized product was dried and collected. MAH content ≥0.9 weight percent (small amount of acid, from hydrolyzed anhydride may be present; MWD about 2.7).

TABLE 2

MAH-g-EO1

| Polymer | Calculated I2* at 190° C. (g/10 min) | Melt Viscosity at 177° C. (cP) | Density (g/cm3) | MAH (wt %) |
|---|---|---|---|---|
| MAH-g-EO1$^a$ | 660 | 13000 | 0.878 | 0.7-1.5 |

$^a$MAH-g-homogeneously branched ethylene/octene copolymer.
*Melt index may be calculated from the following equation (See U.S. Pat. No. 6,335,410):
$12(190° C./2.16 kg) = 3.6126[10^{(log(\eta)-6.6928)/-1.1363}] - 9.31851$, where $\eta$ = Melt viscosity, in cP, at 350° F.

Blend Formulations

All blend formulations were compounded on a Coperion ZSK 26 twin screw extruder. The motor was rated at 40 horsepower, with a maximum speed of 2,650 RPM. The gearbox ratio was 1:89, and the maximum screw speed was 1,200 RPM. The maximum torque for this line was 106 Nm. The feedrate was 30 lbs/hr, the screw RPM was 350. The die temperature was set to 190° C. There was no side arm feeder and no vacuum was pulled. The compounded material was extruded through a two hole die into a 16 foot long chilled water bath. The strands were then passed through a BERLYN Air Knife to remove excess water. Once the strands were cooled and dried, they were pelletized with a LabTech side cut pelletizer. The chopped pellets were then dropped into a plastic lined 50 lb bag. The blends were further dried for 12 hours, at 60° C., at ambient atmosphere.

Film Preparations

Monolayer films (2 mil thickness) were produced using a LabTech blown film line. The barrel temperatures were set to 400° F./450° F./450° F., with a die temperature of 450° F. The layflat width was 13 inches.

Blend Formulations—Set 1

Table 3 shows the set of experiments with blends of ethylene/octene copolymer (LLDPE), EVOH and MAH-g-EO1 or other functionalized polymer. EVOH was EVAL L171B with 27 mol % ethylene. Comparative Ex. A was the control blend. Comparative Ex. B and Inventive Ex. 1 were the compatibilized blends containing AMPLIFY TY 1053H and the MAH-g-EO1, respectively. The total maleic anhydride in the blends were kept constant at 0.12 wt % for Comparative Ex. B and Inventive Ex. 1. Inventive Ex.2 was a compatibilized blend with MAH-g-EO1 at a higher loading, with 0.186 wt % total maleic anhydride in the blend. Blends were formulated, and monolayer films prepared as discussed above.

TABLE 3

Blend formulations—Set 1 Amounts in wt %

| | wt % MAH in the blend* | | | |
|---|---|---|---|---|
| | 0.036 Comparative Ex.A | 0.12 Comparative Ex.B | 0.12 Inventive Ex.1 | 0.186 Inventive Ex.2 |
| AMPLIFY TY 1053H | 3 | 10 | 3 | 3 |
| DOWLEX 2045G | 91.82 | 84.82 | 83.32 | 76.82 |
| EVOH EVAL L171B | 5 | 5 | 5 | 5 |
| MAH-g-EO1 | | | 8.5 | 15 |
| IRGANOX B215 Antioxidant | 0.18 | 0.18 | 0.18 | 0.18 |
| Total | 100 | 100 | 100 | 100 |

*FTIR method.

TEM and Optical Microscopy—Set 1

Transmission Electron Microscopy: Thin strips of the films (monolayer films) were cut with razor blade, and embedded in an epoxy/hardener system. A block face of each film specimen was polished and trimmed to an appropriate size. A flat specimen surface was finally polished, at −60° C., to prevent smearing, using a diamond knife on a LEICA UCT microtome, prior to staining. The polished specimens were adhered to glass slides with the aid of double-sided tape, and placed in a glass jar with a screw lid. The slides were placed in the jar, in order to suspend the blocks about one inch above the staining solution. The polished blocks were stained using the vapor phase of an aqueous ruthenium tetraoxide solution, for two hours, at ambient temperature.

The staining solution was prepared by weighing "0.2 gm" of ruthenium (III) chloride hydrate ($RuCl_3 \times H_2O$) into a glass jar, and adding 10 ml of "5.25 wt %" aqueous sodium hypochlorite to the jar. Sections of approximately 100 nanometers, in thickness, were collected at ambient temperature, using a diamond knife on a LEICA UCT microtome, and these sections were placed on formvar coated, 150 square mesh copper, TEM grids, for TEM observation. A JEOL TEM 1230 was operated at 100 kV accelerating voltage, and bright-field images were collected using GATAN 791 and GATAN 794 cameras.

Optical Microscopy: Optical sections of the monolayer films of approximately, 5 microns thick, were collected at −120° C., using a diamond knife on a LEICA UCT microtome, equipped with an FCS cryo-sectioning chamber. The sections were transferred to a microscope slide, containing a drop of Dow Corning E-200 silicon oil, and covered with a cover glass prior to analysis. Additional sections were obtained and placed on a potassium bromide (KBr) salt window for infra-red micro-spectroscopy analysis. Transmitted, brightfield light, under crossed-polarized, as well as epi-flourescence illumination, modes were used to view the film cross-sections, using a Carl Zeiss Axiolmager Z1m compound microscope. Images were acquired with the aid of a HRc digital camera. In order to capture the observed macro differences between the films, a LEICA MZ-16 stereo microscope was used at low magnification (2 mm scale). The films were illuminated with reflected light to enhance the surface topographies, and reveal the influence of compatibilization on gel formation. Digital images were captured using a NIKON DXM digital camera.

Figure 2:
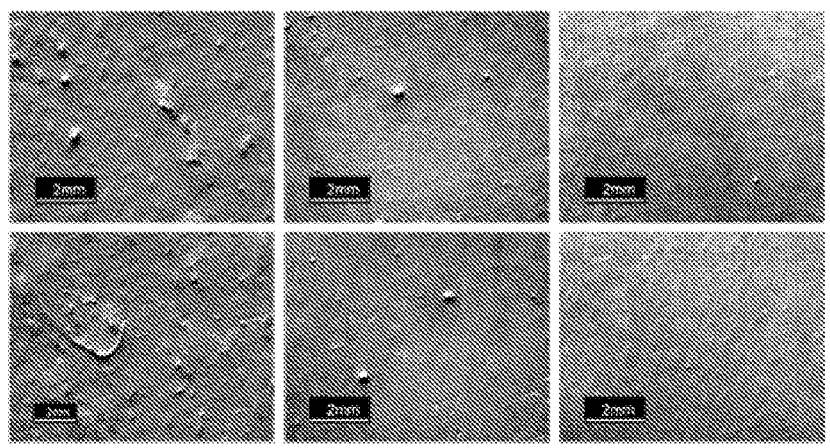
FIG. 2 shows optical microscopy images of films formed from Comparative Ex. A (left), Comparative Ex. B (center) and Inventive Ex. 1 (right).

EVOH was agglomerated into larger domains in Comparative Ex. A, which was the control blend, with no additional compatibilizer. Addition of "8.5 wt % MAH-g-EO1" in Inventive Ex.1 significantly improved the EVOH dispersion in the blend, as shown in FIG. 1 (right TEM images). Inventive Ex.1 produced globally dispersed EVOH domains, in comparison to Comparative Ex. A, which was comprised of a combination of very large domains and a lower concentration of smaller domains. Comparative Ex. B, with 10 wt % TY 1053H as the compatibilizer, resulted in a bimodal size distribution of EVOH domains, with both larger EVOH domains as well as some smaller domains. The optical images in FIG. 2 (Comparative Ex. A left; Comparative ex. B center; Inventive Ex. 1 right) verified that surfaces of the films formed from Comparative Ex. A and Comparative Ex. B consisted of very large gels, believed to be associated with EVOH, in comparison to Inventive Ex. 1 which displayed much fewer gels.

Optical and Mechanical Properties—Set 1

The monolayer films were examined for the following properties.
Clarity (ASTM D1746),
Clarity (Zebedee; ASTM D 1746),
Haze (ASTM D1003),
Elmendorf Tear (ASTM D1922) and
Tensile Testing (ASTM D882).

Table 4 summarizes the optical properties of the films: Comparative Ex.A, Comparative Ex.B, Inventive Ex.1 and Inventive Ex.2.

TABLE 4

Optical Properties—Set 1

| | Comparative Ex.A | Comparative Ex.B | Inventive Ex.1 | Inventive Ex.2 |
|---|---|---|---|---|
| Clarity—standard (%) | 31 | 62 | 90 | 94 |
| Clarity—Zebedee (%) | 0.2 | 4 | 37 | 49 |
| 45° Gloss (%) | 16 | 16 | 34 | 39 |
| Total Haze | 48 | 44 | 24 | 20 |
| Internal Haze | 4.5 | 3.5 | 2.8 | 3.6 |

Figure 3:
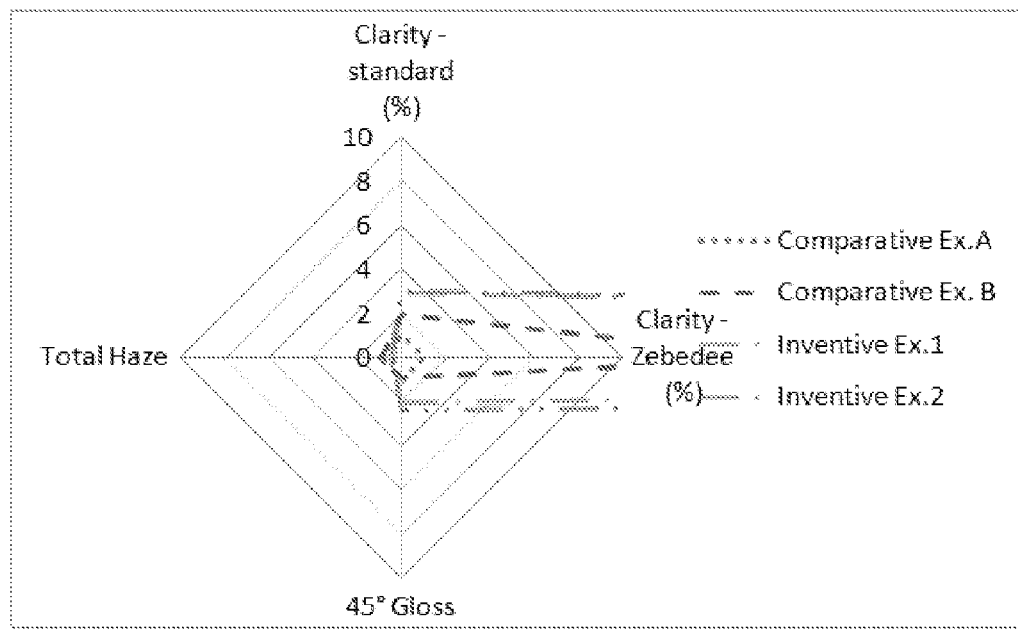
FIG. 3 is a spider diagram depicting optical properties of films formed from Comparative Ex.A, Comparative Ex.B, Inventive Ex.1 and Inventive Ex.2.

FIG. 3 shows the comparison of the optical properties of the films, Comparative Ex. A, Comparative Ex. B, Inventive Ex. 1 and Inventive Ex. 2 in a spider diagram. Comparative Ex. A exhibited high melt fracture that resulted in poor clarity and haze properties. Comparative Ex. B had improved optical properties versus Comparative Ex. A; however, the best optics (high clarity, low haze, high gloss) were achieved with Inventive Ex. 1 and Inventive Ex. 2.

Table 5 shows the comparison of the mechanical properties of the Comparative Ex. A, Comparative Ex. B, Inventive Ex. 1 and Inventive Ex. 2. Inventive Ex. 1 and Inventive Ex. 2 exhibited 30-50% better tear properties in both CD and MD directions.

TABLE 5

Mechanical Properties of the Monolayer Films (2 mil thick)—Set 1

| | Comparative Ex.A | Comparative Ex.B | Inventive Ex.1 | Inventive Ex.2 |
|---|---|---|---|---|
| Normalized Elmendorf—CD | 491 | 470 | 647 | 675 |
| Normalized Elmendorf—MD | 380 | 400 | 630 | 625 |
| Tensile Strength at Break—CD | 2800 | 5250 | 4452 | 3775 |

TABLE 5-continued

Mechanical Properties of the Monolayer Films (2 mil thick)—Set 1

|  | Comparative Ex.A | Comparative Ex.B | Inventive Ex.1 | Inventive Ex.2 |
|---|---|---|---|---|
| Tensile Strength at Break—MD | 2484 | 5030 | 4773 | 4350 |
| Tensile Elongation at Break—CD | 618 | 753 | 795 | 830 |
| Tensile Elongation at Break—MD | 447 | 664 | 736 | 744 |

Blend Formulations—Set 2

Table 6 shows the set of experiments with blends of ethylene/octene copolymer (LLDPE), EVOH and MAH-g-EO1, or other functionalized polymer. EVOH was EVAL H171B with 38 mol % ethylene. Blends were prepared as discussed above. Monolayer films were formed as discussed above.

TABLE 6

Blend Formulations—Set 2 Amounts in wt %

|  | Wt % maleic anhydride (MAH) in the blend* | | |
|---|---|---|---|
|  | 0.036 Comparative Ex.C | 0.12 Comparative Ex.D | 0.12 Inventive Ex.3 |
| AMPLIFY TY 1053H | 3 | 10 | 3 |
| DOWLEX 2045G | 91.82 | 84.82 | 83.32 |
| EVOH EVAL H171B | 5 | 5 | 5 |
| MAH-g-EO1 |  |  | 8.5 |
| B215 Antioxidant | 0.18 | 0.18 | 0.18 |
| total | 100 | 100 | 100 |

*FTIR method.

As can be seen from Table 7, the Inventive Ex. 3 exhibited about an 8-fold increase in clarity (measured by the Zebedee method), as compared to Comparative Ex. C. Table 8 summarizes the mechanical properties of the films—there is no significant reduction in properties upon addition of the MAH-g-EO1. Tear properties of the films formed from Inventive Ex. 3 improved, versus the films formed from Comparative Ex. C or Comparative Ex. D.

TABLE 7

Optical Properties—Set 2 (2 mil monolayer films)

|  | Comparative Ex.C | Comparative Ex.D | Inventive Ex.3 |
|---|---|---|---|
| Clarity—standard (%) | 71 | 52 | 88 |
| Clarity—Zebedee (%) | 4 | 2 | 30 |
| 45° Gloss (%) | 35 | 13 | 33 |
| Total Haze | 22 | 48 | 23 |
| Internal Haze | 3 | 3 | 2.5 |

TABLE 8

Mechanical Properties—Set 2 (2 mil monolayer films)

|  | Comparative Ex.C | Comparative Ex.D | Inventive Ex.3 |
|---|---|---|---|
| Normalized Elmendorf—CD | 570 | 515 | 645 |
| Normalized Elmendorf—MD | 445 | 338 | 640 |
| Tensile Strength at Break—CD | 4435 | 5500 | 4980 |
| Tensile Strength at Break—MD | 5590 | 5260 | 4780 |
| Tensile Elongation at Break—CD | 725 | 775 | 836 |
| Tensile Elongation at Break—MD | 710 | 670 | 750 |

Blend Formulation—Set 3

Table 9 shows the set of experiments with blends of ethylene/octene copolymer (LLDPE), polyamide and MAH-g-EO1 or other functionalized polymer. The polyamide was ULTRAMID B40L (Polyamide 6). Blends were prepared as discussed above. Films formed from the blends were prepared as discussed above.

TABLE 9

Blend Formulations—Set 3 Amounts in wt %

|  | Wt % maleic anhydride (MAH) in the blend* | | |
|---|---|---|---|
|  | 0.036 Comparative Ex.E | 0.12 Comparative Ex.F | 0.121 Inventive Ex.4 |
| AMPLIFY TY 1053H | 3 | 3 | 3 |
| AMPLIFY TY 1052H |  | 10.5 |  |
| DOWLEX 2045G | 76.82 | 66.32 | 68.32 |
| ULTRAMID B40L | 20 | 20 | 20 |
| MAH-g-EO1 |  |  | 8.5 |
| B215 Antioxidant | 0.18 | 0.18 | 0.18 |
| total | 100 | 100 | 100 |

*FTIR method.

Figure 4:
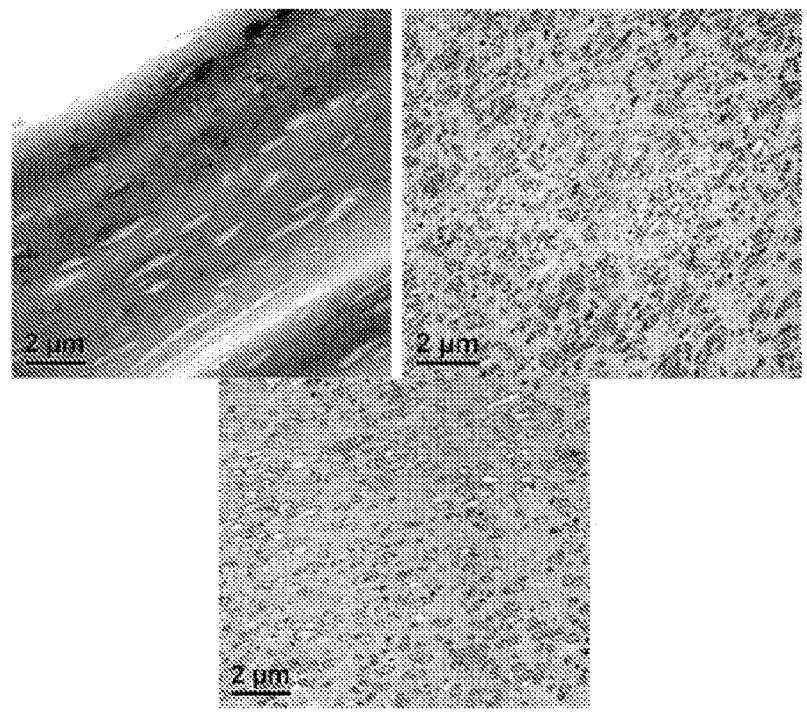
FIG. 4 shows TEM images of films formed from Comparative Ex. E (left top), Comparative Ex. F (right top) and Inventive Ex. 4 (center bottom).
Figure 5:
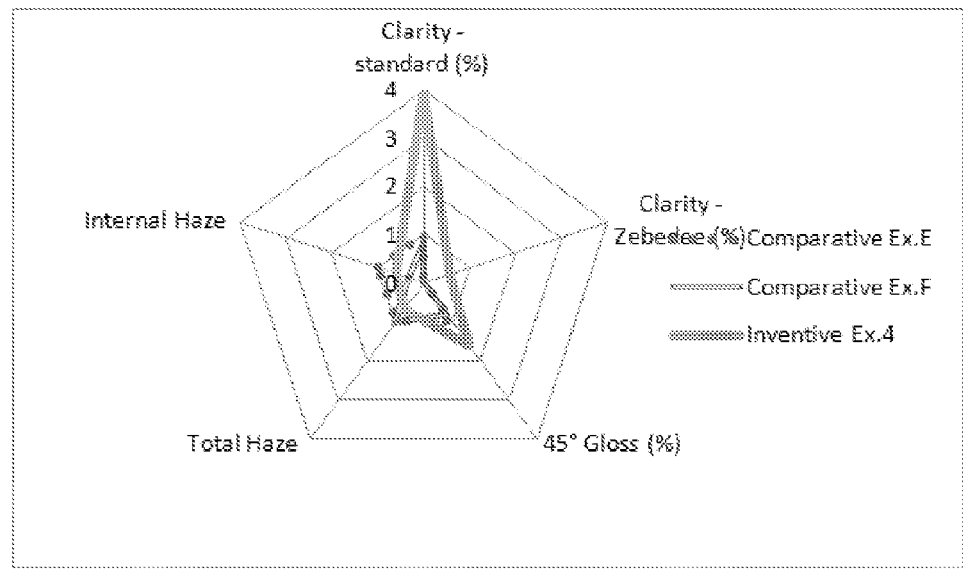
FIG. 5 is a spider diagram depicting optical properties of films formed from Comparative Ex. E, Comparative Ex. F and Inventive Ex. 4.
Figure 6:
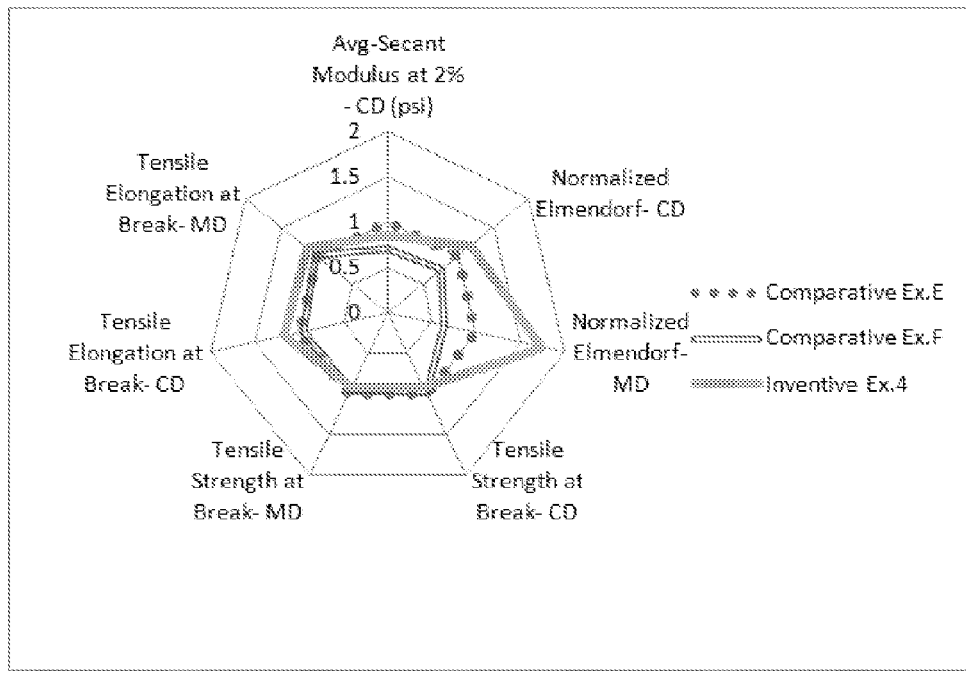
FIG. 6 is a spider diagram depicting mechanical properties of films formed from Comparative Ex. E, Comparative Ex. F and Inventive Ex. 4.

As can be seen from FIG. 4, the control film (Comparative Ex. E, left top), exhibited large polyamide domains in polyethylene matrix. Films formed from Comparative Ex. F 9 right top) and Inventive Ex. 4 (center bottom) both had smaller domains than the control. However, Comparative Ex. F showed more clustering (aggregation) of the domains—the domains were not as globally dispersed as in Inventive Ex. 4. Inventive Ex. 4 showed globally, well-dispersed, less agglomerating, domain particles. The improved dispersion of the small domains in Inventive Ex. 4 provides better optical and mechanical properties, as shown in Table 10 and 11. See also FIGS. 5 and 6.

TABLE 10

Optical Properties—Set 3 (2 mil monolayer films)

|  | Comparative Ex. E | Comparative Ex. F | Inventive Ex.4 |
|---|---|---|---|
| Clarity—standard (%) | 12.6 | 10 | 50 |
| Clarity—Zebedee (%) | 0 | 0 | 0.56 |
| 45° Gloss (%) | 5.7 | 4.6 | 9 |
| Total Haze | 83 | 86 | 56 |
| Internal Haze | 15 | 5 | 9 |

TABLE 11

Mechanical Properties—Set 3 (2 mil monolayer films)

|  | Comparative Ex. E | Comparative Ex. F | Inventive Ex. 4 |
|---|---|---|---|
| Normalized Elmendorf—CD | 320 | 240 | 375 |
| Normalized Elmendorf—MD | 260 | 170 | 450 |
| Tensile Strength at Break—CD | 4600 | 4550 | 4240 |
| Tensile Strength at Break—MD | 5100 | 4820 | 4720 |
| Tensile Elongation at Break—CD | 600 | 575 | 710 |
| Tensile Elongation at Break—MD | 530 | 540 | 610 |

The invention claimed is:

1. A composition comprising at least the following:
   A) from 5 to 20 wt %, based on the weight of the composition of an anhydride and/or carboxylic acid functionalized ethylene/alpha-olefin interpolymer having the following properties:
      i) a melt viscosity (177° C.) less than, or equal to, 70,000 cP, and a melt index greater than, or equal to, 300 g/10 min (190° C., 2.16 kg);
      ii) a density from 0.855 to 0.900 g/cc, and a MWD from 1.5 to 3.5;
   B) an ethylene-based polymer; and
   C) from 5 to 20 wt %, based on the weight of the composition, a polar polymer, and wherein the composition further comprises anhydride and/or carboxylic acid functionalized ethylene-based polymer.

2. The composition of claim 1, wherein the anhydride and/or carboxylic acid functionalized ethylene/alpha-olefin interpolymer has i) a melt viscosity (177° C.) less than, or equal to, 50,000 cP.

3. The composition of claim 1, wherein the polar polymer is selected from an ethylene vinyl alcohol polymer, a polyamide, a polyester, a polyester glycol, or combinations thereof.

4. The composition of claim 3, wherein the polar polymer is selected from an ethylene vinyl alcohol polymer, a polyamide, or a combination thereof.

5. The composition of claim 1, wherein the anhydride and/or carboxylic acid functionalized ethylene/alpha-olefin interpolymer has a density from 0.860 $g/cm^3$ to 0.890 $g/cm^3$.

6. The composition of claim 1, wherein the anhydride and/or carboxylic acid functionalized ethylene/alpha-olefin interpolymer has a weight average molecular weight (Mw) from 4,000 to 30,000 g/mole.

7. The composition of claim 1, wherein the ethylene-based polymer (component B) has a melt index (I2) from 0.5 to 50 g/10 min (190° C., 2.16 kg).

8. An article comprising at least one component formed from the composition of claim 1.

9. A film comprising at least one layer formed from the composition of claim 1.

10. The film of claim 9, further comprising at least one layer formed from a composition comprising a polar polymer.

11. The film of claim 9, further comprising at least one layer formed from a composition comprising an olefin-based polymer.

12. A method of making a film, said method comprising extruding the composition of claim 1.

\* \* \* \* \*